(12) United States Patent
Bakshi et al.

(10) Patent No.: US 9,335,845 B2
(45) Date of Patent: May 10, 2016

(54) SELECTIVE ACCELEROMETER DATA PROCESSING METHODS AND APPARATUS

(71) Applicant: mCube, Incorporated, San Jose, CA (US)

(72) Inventors: Rahul Bakshi, San Jose, CA (US); Jobe Price, North Liberty, IA (US)

(73) Assignee: mCube Inc., San Jose, CA (US)

( * ) Notice: Subject to any disclaimer, the term of this patent is extended or adjusted under 35 U.S.C. 154(b) by 104 days.

(21) Appl. No.: 13/755,487

(22) Filed: Jan. 31, 2013

(65) Prior Publication Data

US 2014/0035842 A1    Feb. 6, 2014

Related U.S. Application Data

(60) Provisional application No. 61/593,292, filed on Jan. 31, 2012, provisional application No. 61/593,299, filed on Jan. 31, 2012, provisional application No. 61/593,302, filed on Jan. 31, 2012, provisional application No. 61/593,847, filed on Feb. 1, 2012.

(51) Int. Cl.
*G06F 3/041* (2006.01)
*H04M 1/02* (2006.01)
*G06F 1/16* (2006.01)

(52) U.S. Cl.
CPC .............. *G06F 3/041* (2013.01); *G06F 1/1643* (2013.01); *G06F 1/1694* (2013.01); *H04M 1/0266* (2013.01); *G06F 2200/1636* (2013.01); *H04M 2250/70* (2013.01)

(58) Field of Classification Search
CPC ..... G06F 3/041; G06F 1/1643; G06F 1/1694; G06F 2200/1636; H04M 1/0266; H04M 2250/70

USPC ......................................................... 345/173
See application file for complete search history.

(56) References Cited

U.S. PATENT DOCUMENTS

| | | | |
|---|---|---|---|
| 7,733,637 B1 | 6/2010 | Lam | |
| 8,904,410 B2 | 12/2014 | Kelly | |
| 2005/0254712 A1 | 11/2005 | Lindeman | |
| 2008/0088468 A1 | 4/2008 | Kim | |
| 2009/0099820 A1 | 4/2009 | Kaplan | |
| 2010/0156675 A1 | 6/2010 | Ganey et al. | |
| 2010/0194682 A1 | 8/2010 | Orr et al. | |
| 2011/0199342 A1 | 8/2011 | Vartanian et al. | |
| 2011/0291922 A1 | 12/2011 | Stewart et al. | |
| 2011/0300901 A1* | 12/2011 | Shen et al. | 455/556.1 |
| 2011/0316774 A1 | 12/2011 | Clifton et al. | |
| 2011/0316805 A1* | 12/2011 | Yamada | 345/173 |
| 2012/0046082 A1 | 2/2012 | Higashima et al. | |
| 2012/0075192 A1 | 3/2012 | Marsden et al. | |
| 2013/0257788 A1 | 10/2013 | Bakshi et al. | |

* cited by examiner

*Primary Examiner* — Charles Hicks
(74) *Attorney, Agent, or Firm* — Kilpatrick Townsend & Stockton LLP

(57) ABSTRACT

A computer-implemented method for reducing extraneous input in a portable device programmed to perform the method includes displaying with the portable device, a text entry interface via a display to a user of the portable device, receiving with the portable device, one or more taps on a portion of the portable device other than the display, wherein the one or more taps is associated with a first action, while displaying with the portable device, an interface other than a text entry interface via the display to the user, the method includes performing with the portable device, the first action in response to the one or more taps, and while displaying with the portable device, a text entry interface via the display to the user, the method includes inhibiting with the portable device, the first action in response to the one or more taps.

12 Claims, 2 Drawing Sheets

SELECTIVE ACCELEROMETER DATA PROCESSING METHODS AND APPARATUS

CROSS REFERENCE TO RELATED APPLICATIONS

The present application is a non-provisional of 61/593,292 filed Jan. 31, 2012, 61/593,299 filed Jan. 31, 2012, 61/593,302 filed Jan. 31, 2012, and 61/593,847 filed Jan. 31, 2012, and incorporates them by reference, for all purposes.

BACKGROUND OF THE INVENTION

The present invention relates to portable computing devices. More specifically, the present invention relates to methods for processing of data from a MEMS device in a portable computing device.

Currently, more and more portable computing devices are becoming available to the average user/consumer. Such devices may include reader-type devices (e.g. Kindle, Nook), tablet-type devices (e.g. iPad, GalaxyTab), phone-type devices (e.g. iPhone, GalaxyS2), or the like. Many of these devices now include specialized hardware (e.g. MEMS devices) that can sense physical properties or physical inputs to the device. Such specialized hardware typically includes 3-axis accelerometers, a gyroscope, and a compass that are provided on separate electronic packages.

Many useful and popular software applications have been written for portable computing devices that use information from the specialized hardware. In one example in the operating system, by turning a computing device on its side, the image displayed on a display will rotate to match the new orientation of the computing device. In one example in an augmented reality application, by moving the portable computing device in three-dimensional space, information presented to the user will vary and depend upon the compass orientation of the device as well as the gyroscopic orientation of the device.

One problem discovered by the inventors of the present invention is that sometimes the information from the MEMS devices do not help the user, and instead interfere with the user. As an example, when entering text into a text-entry display or screen on a portable computing device, a double space-bar tap is automatically replaced with a period symbol. However, if the user is not careful, the user may double tap on a region off the touch-sensitive screen. In some cases, a double tap on a region off the touch-sensitive screen may be associated with a command, such as answering a telephone, running a specific program, returning to home state, or the like. Accordingly, instead of entering a period symbol, the user may inadvertently perform an unwanted action.

In light of the above, what is desired are methods and apparatus that address the issues described above.

BRIEF SUMMARY OF THE INVENTION

The present invention relates to portable computing devices. More specifically, the present invention relates to methods for processing of data from a MEMS device in a portable computing device.

In some embodiments of the present invention, a portable device runs a program enabling a user to enter text, such as e-mail, word processing, spreadsheet, web browsing, or the like. When in such a text-entry mode, interrupts generated from MEMS devices within the computing device that senses particular physical perturbations, are ignored and not processed. When not in such a text-entry mode, interrupts generated from MEMS devices within the computing device are processed, as usual.

According to one aspect of the invention, a computer-implemented method for reducing extraneous input in a portable device programmed to perform the method is disclosed. One process includes displaying with the portable device, a text entry interface via a display to a user of the portable device, and receiving with the portable device, one or more taps on a portion of the portable device other than the display, wherein the one or more taps is associated with a first action. In one method, while displaying with the portable device, an interface other than a text entry interface via the display to the user, the method includes performing with the portable device, the first action in response to the one or more taps. In one method while displaying with the portable device, a text entry interface via the display to the user, the method includes inhibiting with the portable device, the first action in response to the one or more taps.

According to another aspect of the invention, a portable device programmed to reduce extraneous user-input is described. One apparatus includes a housing comprising a display portion and a body portion, and a display portion of the housing configured to display a text entry interface to a user of the portable device, configured to display a non-text entry interface to the user, and configured to receive one or more taps by a user on the display portion. A system includes a physical perturbation sensor disposed within the housing, wherein the physical perturbation sensor is configured to sense one or more physical taps by the user on a portion of the body portion, and a processor coupled to the display portion and to the physical perturbation sensor and disposed within the housing. In some embodiments, the processor is configured to perform a first action while the non-text entry interface is displayed to the user, in response to the one or more taps by the user, and the processor is configured to inhibit the first action while the text entry interface is displayed to the user, in response to the one or more taps by the user.

According to yet another aspect of the invention, a computer program product comprising computer-readable code resident on a non-transitory tangible media for programming a computing system to reduce extraneous input to the computing system is described. The computer program product may include code that programs the computing system to display on a display a text entry interface to a user of the computing system, and code that programs the computing system to display on a display a non-text entry interface to the user of the computing system. The program may include code that programs the computing system to receive one or more physical taps on a portion of the computing system other than the display, wherein the one or more physical taps is associated with a default action, and code that programs the computing system to perform the default action in response to the one or more physical taps while displaying the non-text entry interface to the user. The code may include code that programs the computing system to inhibit the default action in response to the one or more physical taps while displaying the text entry interface to the user.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
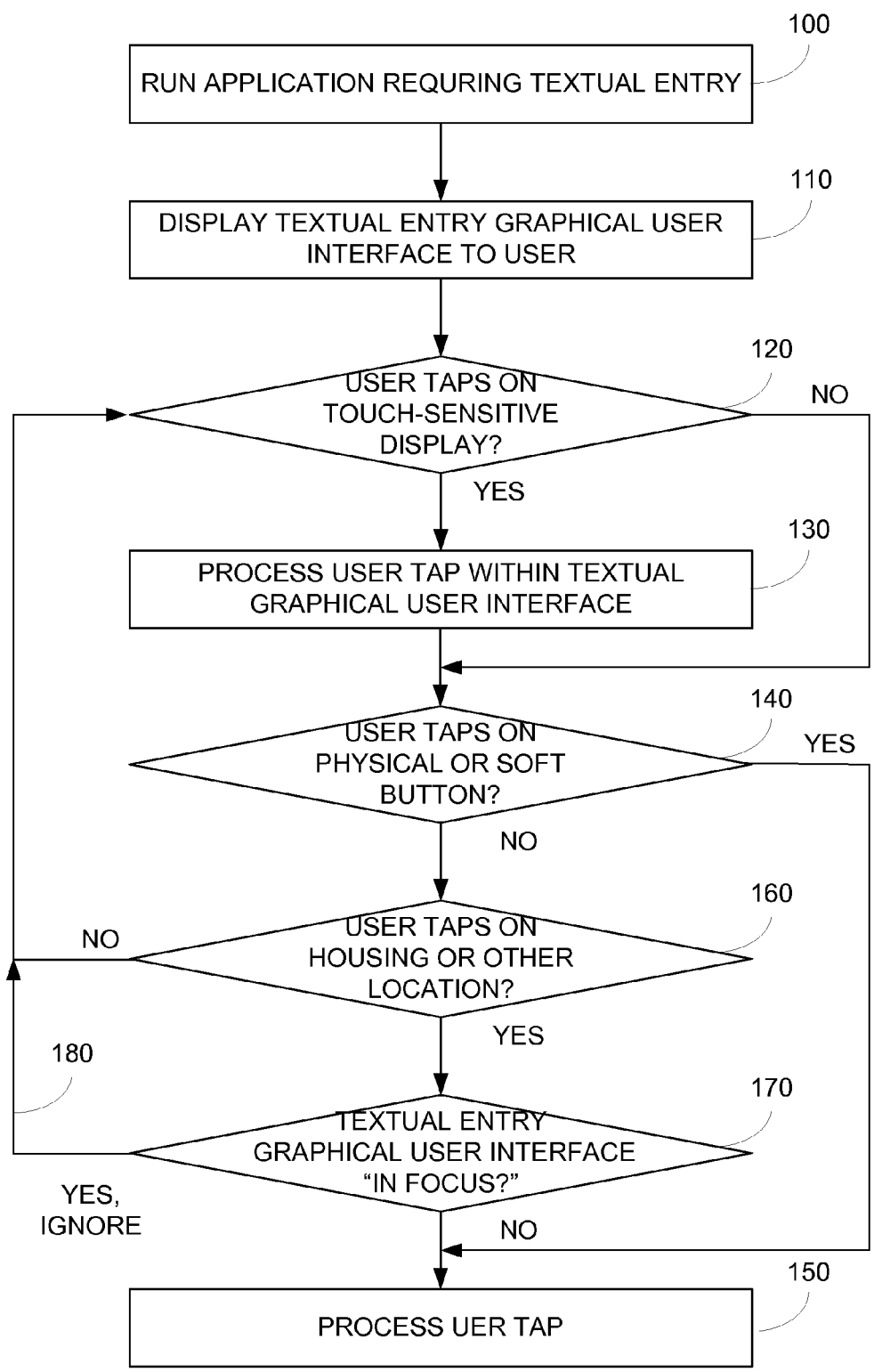
FIG. 1 illustrates a block diagram of a process according to various embodiments of the present invention.

FIG. 1 illustrates a block diagram of a process according to various embodiments of the present invention.

Initially, a user of a portable device may invoke an application that provides for textual entry, step 100. In various embodiments, the application may include a mail-related application, a text message program, an instant message program, a web browsing application, a note pad-type application, or the like. In response, one or more text-entry user interfaces may be displayed on a touch-sensitive display to the user, step 110. In various embodiments, the text-entry user interface may include one or more on-screen keyboards, word suggestions, text display area, and the like.

In FIG. 1, a determination is made by the device whether the user taps or touches the display, step 120. In various embodiments, the display is a touch-sensitive display and can report screen locations where the user is touching. In some embodiments, the touch-sensitive display is based upon capacitive sensors, resistive sensors, optical sensors, physical press sensors, or the like. In response to a user touch of the display as sensed in step 120, the user touch is processed, step 130. In various examples, the screen location where the user touches is associated with an entry of a letter from a keyboards, a selection of a word from suggested words, a repositioning of a cursor from one document location to another location, or any other conventional word processing command, e.g. save, open, spell check, and the like.

In various embodiments of the present invention, a determination is made as to whether a button on the device is pushed by the user, step 140. Buttons may include physical buttons or switches, capacitive non-display buttons on the device, resistive non-display buttons on the device, or the like. In response to a user "press" of the button as sensed in step 140, the button press is processed, step 150. In various examples, the button press may be associated with various non-program related actions, such as return to home screen, volume up, volume down, and the like; and the button press may be associated with various program related actions, such as display a menu of commands, undo, select, and the like.

As illustrated in FIG. 1, in some embodiments, a determination is made as to whether the user taps, double taps, or the like the device, in a location not associated with the display or a button, step 160. In various embodiments, the tap, double tap, or the like is associated with a physical perturbation of the device by the user as sensed by one or more MEMS-based sensors of the device. For example, a user tap on a casing or housing of the device may be sensed by a MEMS-based accelerometer as one or more accelerations in an x, y, and/or z-axis. As another example, a user twist of the device may be sensed by a MEMS-based gyroscope as one or more rotations around the x, y, and/or z-axis. In other embodiments, other types of physical perturbations may be sensed by other MEMS-based sensors of the device, such as air pressure, presence of a magnetic device, or the like. In various embodiments, the MEMS-based sensors may generate one or more interrupts or exceptions in response to the physical perturbations.

Next, in some embodiments, a determination is made as to whether the user is currently using the text-entry program, as discussed in conjunction with steps 100 and 110, above, step 170. In various embodiments, this process may include determining whether the text-entry program is not only running, but is the top-most or "in-focus" process with which the user is currently interacting. In various embodiments, a software stack on the device may be used for this determination. In various examples, this determination can be whether the user is currently typing letters for a web address, editing a document, replying to an e-mail, or the like.

In various embodiments, if the user is currently using a text-entry display, the physical perturbation sensed by one or MEMS-based devices is ignored, step 180. In some embodiments, ignoring of the generated interrupt or exception may be performed at different levels, based upon implementation requirements. In some examples, the masking of the interrupt or exception may be performed at a software abstraction layer; at the chip level (e.g. MEMS-device level); or the like.

In cases where the text-entry display is not "in-focus" or the top of the software stack, the interrupt or exception may be processed in a conventional manner. As merely an example, for an incoming phone call, a user double-tap on the housing of a phone may be received and may cause the phone call to be answered; in an image viewing or processing program, a user tap on the casing of a tablet may be received and may cause the image to be zoomed to fit the display of the tablet; or the like.

Figure 2:
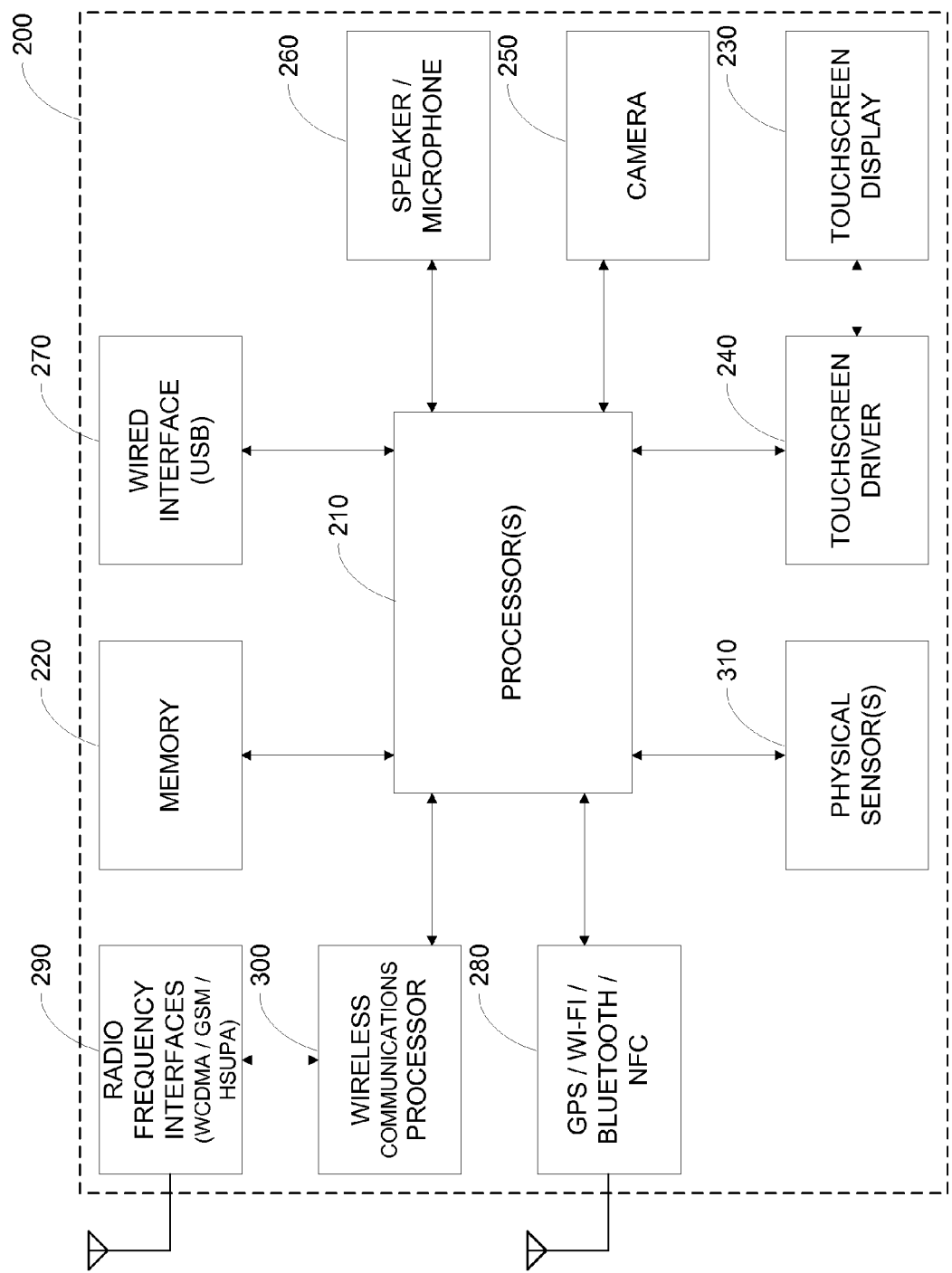
FIG. 2 illustrates a block diagram of additional embodiments of the present invention.

FIG. 2 illustrates a functional block diagram of various embodiments of the present invention. In FIG. 2, a computing device 200 typically includes an applications processor 210, memory 220, a touch screen display 230 and driver 240, an image acquisition device 250, audio input/output devices 260, and the like. Additional communications from and to computing device are typically provided by via a wired interface 270, a GPS/Wi-Fi/Bluetooth interface 280, RF interfaces 290 and driver 300, and the like. Also included in various embodiments are physical sensors 310.

In various embodiments, computing device 200 may be a hand-held computing device (e.g. Apple iPad, Apple iTouch, Dell Mini slate, Lenovo Skylight/IdeaPad, Asus EEE series, Microsoft Courier, Samsung Galaxy Tab, Android Tablet), a portable telephone (e.g. Apple iPhone, Motorola Droid series, Google Nexus S, HTC Sensation, Samsung Galaxy S series, Palm Pre series, Nokia Lumina series), a portable computer (e.g. netbook, laptop, ultrabook), a media player (e.g. Microsoft Zune, Apple iPod), a reading device (e.g. Amazon Kindle Fire, Barnes and Noble Nook), or the like.

Typically, computing device 200 may include one or more processors 210. Such processors 210 may also be termed application processors, and may include a processor core, a video/graphics core, and other cores. Processors 210 may be a processor from Apple (A4/A5), Intel (Atom), NVidia (Tegra 2, 3), Marvell (Armada), Qualcomm (Snapdragon), Samsung, TI (OMAP), or the like. In various embodiments, the processor core may be an Intel processor, an ARM Holdings processor such as the Cortex-A, -M, -R or ARM series processors, or the like. Further, in various embodiments, the video/graphics core may be an Imagination Technologies processor PowerVR-SGX, -MBX, -VGX graphics, an Nvidia graphics processor (e.g. GeForce), or the like. Other processing capability may include audio processors, interface controllers, and the like. It is contemplated that other existing and/or later-developed processors may be used in various embodiments of the present invention.

In various embodiments, memory 220 may include different types of memory (including memory controllers), such as flash memory (e.g. NOR, NAND), pseudo SRAM, DDR SDRAM, or the like. Memory 220 may be fixed within computing device 200 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, touch screen display 230 and driver 240 may be based upon a variety of later-developed or current touch screen technology including resistive displays, capacitive displays, optical sensor displays, electromagnetic resonance, or the like. Additionally, touch screen display 230 may include single touch or multiple-touch sensing capability. Any later-developed or conventional output display technology may be used for the output display, such as TFT-LCD, OLED, Plasma, trans-reflective (Pixel Qi), electronic ink (e.g. electrophoretic, electrowetting, interferometric modulating). In various embodiments, the resolution of such displays and the resolution of such touch sensors may be set based upon engineering or non-engineering factors (e.g. sales, marketing). In some embodiments of the present invention, a display output port, such as an HDMI-based port or DVI-based port may also be included.

In some embodiments of the present invention, image capture device 250 may include a sensor, driver, lens and the like. The sensor may be based upon any later-developed or convention sensor technology, such as CMOS, CCD, or the like. In various embodiments of the present invention, image recognition software programs are provided to process the image data. For example, such software may provide functionality such as: facial recognition, head tracking, camera parameter control, or the like.

In various embodiments, audio input/output 260 may include conventional microphone(s)/speakers. In some embodiments of the present invention, three-wire or four-wire audio connector ports are included to enable the user to use an external audio device such as external speakers, headphones or combination headphone/microphones. In various embodiments, voice processing and/or recognition software may be provided to applications processor 210 to enable the user to operate computing device 200 by stating voice commands. Additionally, a speech engine may be provided in various embodiments to enable computing device 200 to provide audio status messages, audio response messages, or the like.

In various embodiments, wired interface 270 may be used to provide data transfers between computing device 200 and an external source, such as a computer, a remote server, a storage network, another computing device 200, or the like. Such data may include application data, operating system data, firmware, or the like. Embodiments may include any later-developed or conventional physical interface/protocol, such as: USB 2.0, 3.0, micro USB, mini USB, Firewire, Apple iPod connector, Ethernet, POTS, or the like. Additionally, software that enables communications over such networks is typically provided.

In various embodiments, a wireless interface 280 may also be provided to provide wireless data transfers between computing device 200 and external sources, such as computers, storage networks, headphones, microphones, cameras, or the like. As illustrated in FIG. 2, wireless protocols may include Wi-Fi (e.g. IEEE 802.11 a/b/g/n, WiMax), Bluetooth, IR, near field communication (NFC), ZigBee and the like.

GPS receiving capability may also be included in various embodiments of the present invention, however is not required. As illustrated in FIG. 2, GPS functionality is included as part of wireless interface 280 merely for sake of convenience, although in implementation, such functionality is currently performed by circuitry that is distinct from the Wi-Fi circuitry and distinct from the Bluetooth circuitry.

Additional wireless communications may be provided via RF interfaces 290 and drivers 300 in various embodiments. In various embodiments, RF interfaces 290 may support any future-developed or conventional radio frequency communications protocol, such as CDMA-based protocols (e.g. WCDMA), GSM-based protocols, HSUPA-based protocols, or the like. In the embodiments illustrated, driver 300 is illustrated as being distinct from applications processor 210. However, in some embodiments, these functionalities are provided upon a single IC package, for example the Marvel PXA330 processor, and the like. It is contemplated that some embodiments of computing device 200 need not include the RF functionality provided by RF interface 290 and driver 300.

FIG. 2 also illustrates computing device 200 to include physical sensors 310. In various embodiments of the present invention, physical sensors 310 are multi-axis Micro-Electro-Mechanical Systems (MEMS) based devices being developed by M-cube, the assignee of the present patent application. Physical sensors 310 developed by M-cube currently include very low power three-axis sensors (linear, gyro or magnetic); ultra-low jitter three-axis sensors (linear, gyro or magnetic); low cost six-axis motion sensor (combination of linear, gyro, and/or magnetic); ten-axis sensors (linear, gyro, magnetic, pressure); and various combinations thereof.

Various embodiments may include an accelerometer with a reduced substrate displacement bias, as described above. Accordingly, using such embodiments, computing device 200 is expected to have a lower sensitivity to temperature variations, lower sensitivity to production/assembly forces imparted upon to an accelerometer, faster calibration times, lower production costs, and the like.

As described in the patent applications referenced above, various embodiments of physical sensors 310 are manufactured using a foundry-compatible process. As explained in such applications, because the process for manufacturing such physical sensors can be performed on a standard CMOS fabrication facility, it is expected that there will be a broader adoption of such components into computing device 200. In other embodiments of the present invention, conventional physical sensors 310 from Bosch, ST Microelectrnics, Analog Devices, Kionix or the like may be used.

In various embodiments, any number of future developed or current operating systems may be supported, such as iPhone OS (e.g. iOS), WindowsMobile (e.g. 7, 8), Google Android (e.g. 3.x, 4.x), Symbian, or the like. In various embodiments of the present invention, the operating system may be a multi-threaded multi-tasking operating system. Accordingly, inputs and/or outputs from and to touch screen display 230 and driver 240 and inputs/or outputs to physical sensors 310 may be processed in parallel processing threads. In other embodiments, such events or outputs may be processed serially, or the like. Inputs and outputs from other functional blocks may also be processed in parallel or serially, in other embodiments of the present invention, such as image acquisition device 250 and physical sensors 310.

FIG. 2 is representative of one computing device 200 capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 2. For example, in various embodiments, computing device 200 may lack image acquisition unit 250, or RF interface 290 and/or driver 300, or GPS capability, or the like. Additional functions may also be added to various embodiments of computing device 200, such as a physical keyboard, an additional image acquisition device, a trackball or trackpad, a joystick, or the like. Further, it should be understood that multiple functional blocks may be embodied into a single physical package or device, and various functional blocks may be divided and be performed among separate physical packages or devices.

Further embodiments can be envisioned to one of ordinary skill in the art after reading this disclosure. As an example, in response to an identified context, e.g. gesture, one or more applications may be run on behalf of a user. Such embodiments may be termed, gestures or context to enable indoor navigation application on a mobile device.

Currently, one of the problems in invoking navigation applications on a mobile device is the number of menus, clicks and taps needed to invoke it. In a typical mobile device, the user has to go through the following steps: Unlock the mobile device, Navigate to the applications menu or shortcut, Invoke the application, and then put the mobile device in navigation mode.

In various embodiments of the present invention, a user may select a pre-defined gesture such as a tap, double-tap, etc. or define their own gesture. This gesture is then associated with a program, such as an indoor location software application, or the like. In some embodiments, this gesture definition could be in the form of a signature, etc. In other embodiments, OEM defined gestures may be pre-associated with a specific program or application.

Subsequently, in various embodiments, the user gestures with the mobile device, or otherwise enters specific gestures with the mobile device. Next, the user gestures are compared to the pre-defined gestures, discussed above. In various embodiments, when the user gestures match a pre-defined gesture, the associated application is invoked, a specific action is taken, or the like. In some embodiments, the gesture may be matched, and the application or action may be taken irrespective of the device state, e.g. whether the mobile device is locked, unlocked, running an application, or the like. As an example, if a context determines that the user position has moved quicker than walking and/or along roads or rail lines, embodiments may determine that a navigation/mapping program should be automatically run. Such embodiments may believe the user is in a car/taxi/bus/subway, or the like, and that the user should be aware of where they are. In other embodiments, a one or more dialog boxes may be presented to the user to verify whether the application or specific action should be taken.

In a specific example, a navigation application is running as a background service, and with a double-tap gesture by the user, that navigation application may in foreground and the program put into a navigation mode. In light of the present patent disclosure, one of ordinary skill in the art will recognize many other applications and combinations that are within the scope of embodiments of the present invention.

In light of the present patent disclosure, one of ordinary skill in the art will recognize many other operations may be performed, as embodiments of the present invention. For example, embodiments of (value-added) services may include personal health assistants, targeted discount coupons, or the like.

In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for reducing extraneous input in a portable device programmed to perform the method comprising:
running an application requiring a textual entry;
displaying a textual entry graphical interface via a display to a user of the portable device;
receiving one or more taps from the user on a touch-sensitive display, and processing the one or more taps on the touch-sensitive display within the textual entry graphical interface;
receiving one or more taps from the user on a physical or soft button, and processing the one or more taps on the physical or soft button;
receiving one or more taps on a portion of the portable device other than the touch-sensitive display or the physical or soft button, the portion of the portable device being on a backside of the portable device, wherein the one or more taps is associated with a first action;
determining if the textual entry graphical interface is a top-most process with which the user is currently interacting;
if it is determined that the textual entry graphical interface is the top-most process, ignoring the one or more taps on a portion of the portable device other than the touch-sensitive display or the physical or soft button; and
if it is determined that the textual entry graphical interface is not the top-most process, processing the one or more taps on a portion of the portable device other than the touch-sensitive display or the physical or soft button and performing the first action.

2. The computer-implemented method of claim 1 wherein receiving one or more taps further comprises generating, with the portable device, an interrupt or an event indicator.

3. The computer-implemented method of claim 2 wherein ignoring the one or more taps comprises ignoring with the portable device, the interrupt or event indicator.

4. The computer-implemented method of claim 3 wherein ignoring with the portable device comprises ignoring with the portable device, the interrupt or event indicator in a level selected from a group consisting of: a software abstraction level, a device level.

5. The computer-implemented method of claim 1 further comprising
receiving, with the portable device, one or more taps on the display of the portable device; and
displaying, with the portable device, one or more characters in the text entry interface via the display to the user of the portable device.

6. A portable device programmed to reduce extraneous user input, wherein the portable device comprises:
a housing comprising a display portion and a body portion, the body portion being a portion of the portable device other than a touch-sensitive display or a physical or soft button;
the display portion of the housing configured to display a text entry interface to a user of the portable device, configured to display a non-text entry interface to the user, and configured to receive one or more taps by a user on the display portion;

a physical perturbation sensor disposed within the housing, wherein the physical perturbation sensor is configured to sense one or more physical taps by the user on a portion of the body portion, wherein the perturbation sensor is selected from a group of MEMS (Micro-Electro-Mechanical System) sensors consisting of: an accelerometer, a gyroscope, a magnetometer, a pressure sensor;

wherein the physical perturbation sensor is also configured to generate an interrupt or an event indicator in response to sensing the one or more physical taps by the user on a backside of the housing;

a processor coupled to the display portion and to the physical perturbation sensor and disposed within the housing;

wherein the processor is configured to perform a first action, while the non-text entry interface is displayed to the user, in response to the one or more taps by the user; and wherein the processor is configured to inhibit the first action, while the text entry interface is displayed to the user, in response to the one or more taps by the user.

7. The portable device of claim 6 wherein the first action comprises a processing the interrupt or event indicator.

8. The portable device of claim 7 wherein the processor is configured to inhibit processing the interrupt or event indicator in a level selected from a group consisting of: a software abstraction level, a device level.

9. The portable device of claim 6
wherein the display portion comprises an output display and a touch sensor;
wherein the touch sensor is configured to sense the one or more taps by the user; and
wherein the touch sensor is selected from a group consisting of: a capacitive sensor, a resistive sensor.

10. The portable device of claim 6
wherein the body portion comprises one or more physical buttons; and
wherein the portion of the body portion excludes the one or more capacitive-touch portions.

11. The portable device of claim 6
wherein body portion comprises one or more capacitive-touch portions; and
wherein the portion of the body portion excludes the one or more capacitive-touch portions.

12. A computer program product comprising computer-readable code resident on a non-transitory tangible media for programming a computer system to reduce extraneous input to the computing system, the computer program product comprising:
code that programs the computing system to display, on a display, a text entry interface to a user of the computing system;
code that programs the computing system to display, on a display, a non-text entry interface to the user of the computing system;
code that programs the computing system to receive one or more physical taps on a backside of a casing of the computing system not associated with a physical button or a capacitive sensor, wherein the one or more physical taps is associated with a default action;
code that programs the computing system to perform the default action in response to the one or more physical taps while displaying the non-text entry interface to the user; and
code that programs the computing system to inhibit the default action in response to the one or more physical taps while displaying the text entry interface to the user;
wherein the code that programs the computer system to receive the one or more physical taps comprises code that programs the computer system to receive an interrupt or an event indicator from a MEMS (Micro-Electro-Mechanical System) device in response to the one or more physical taps;
wherein the MEMS device is selected from a group consisting of: an accelerometer, a gyroscope, a magnetometer, a pressure sensor, a MEMS sensor.

* * * * *